US008243622B2

(12) United States Patent
Shin et al.

(10) Patent No.: US 8,243,622 B2
(45) Date of Patent: Aug. 14, 2012

(54) WIRELESS COMMUNICATION SYSTEM FOR INTERCONNECTING AD-HOC NETWORK AND INFRASTRUCTURE NETWORK, AND WIRELESS TERMINAL AND COMMUNICATION METHOD THEREFOR

(75) Inventors: Dong-Yun Shin, Seongnam-si (KR); Kyoung-Lae Noh, Seoul (KR); In-Ho Park, Seoul (KR); Giu-Yeol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/388,184

(22) Filed: Feb. 18, 2009

(65) Prior Publication Data

US 2009/0213760 A1 Aug. 27, 2009

(30) Foreign Application Priority Data

Feb. 22, 2008 (KR) ........................ 10-2008-0016323

(51) Int. Cl.
*H04L 12/28* (2006.01)
*H04B 7/00* (2006.01)
(52) U.S. Cl. ........................ 370/254; 455/522
(58) Field of Classification Search .................. None
See application file for complete search history.

(56) References Cited

U.S. PATENT DOCUMENTS

| 2004/0192204 A1* | 9/2004 | Periyalwar et al. ............. 455/25 |
| 2006/0094456 A1* | 5/2006 | Rittle et al. .................... 455/519 |
| 2006/0205408 A1* | 9/2006 | Nakagawa et al. ............ 455/445 |
| 2008/0069105 A1* | 3/2008 | Costa et al. .................... 370/392 |
| 2009/0161610 A1* | 6/2009 | Kang et al. ..................... 370/329 |
| 2009/0290494 A1* | 11/2009 | Govindan et al. ............. 370/238 |
| 2009/0325622 A1* | 12/2009 | Matsumura et al. ........... 455/522 |

OTHER PUBLICATIONS

WO2007/043827, Kang et al., publication date Apr. 19, 2007.*

* cited by examiner

*Primary Examiner* — John Blanton
(74) *Attorney, Agent, or Firm* — Jefferson IP Law, LLP

(57) ABSTRACT

A wireless communication system for interconnecting an ad-hoc network and an IS network, and a wireless terminal and communication method therefor are disclosed. The communication method includes transmitting a discovery signal including terminal information of the wireless terminal to a radio network, receiving a response signal including information for network access from a base station or another wireless terminal, which has received the discovery signal, selecting an operation mode for access to a network through the base station or the other wireless terminal, based on the response signal, communicating with the base station and accessing the IS network when the selected operation mode corresponds to a first mode and accessing a network, to which the other wireless terminal belongs, through a licensed frequency band of the IS network when the selected operation mode corresponds to a second mode. Accordingly, it is possible to support communication through an existing infrastructure and support communication of an ad-hoc network scheme, through use of a licensed frequency band assigned to the provider of an existing IS network.

17 Claims, 11 Drawing Sheets

WIRELESS COMMUNICATION SYSTEM FOR INTERCONNECTING AD-HOC NETWORK AND INFRASTRUCTURE NETWORK, AND WIRELESS TERMINAL AND COMMUNICATION METHOD THEREFOR

PRIORITY

This application claims the benefit under 35 U.S.C. §119(a) of a Korean patent application filed on Feb. 22, 2008 in the Korean Intellectual Property Office and assigned Serial No. 10-2008-0016323, the entire disclosure of which is hereby incorporated by reference.

BACKGROUND OF THE INVENTION

1. Field of the Invention

The present invention relates to a wireless communication system and a communication method therefor. More particularly, the present invention relates to a wireless communication system for interconnecting an ad-hoc network and an infrastructure network, and a wireless terminal and a communication method therefor.

2. Description of the Related Art

Wireless networks include a cellular communication system in which mobile voice communication and data communication are possible. Conventionally, wireless communication systems in the form of a wireless Local Area Network (LAN), a Metropolitan Area Network (MAN), a Wide Area Network (WAN) and the like are being improved with recent developments of communication technology. An example of a wireless LAN includes a mobile ad-hoc network. The ad-hoc network is a network temporarily constructed by a plurality of wireless terminals without using a fixed network infrastructure. The ad-hoc network is different from general networks in which wired base stations or Access Points (APs) provide service to wireless terminals. In the ad-hoc network, each wireless terminal is a host and can simultaneously function as a base station or router for transferring data to other wireless terminals. Wireless terminals which can be used in the ad-hoc network include various terminals having mobility, such as mobile terminals, notebook computers and Personal Digital Assistants (PDAs), having interfaces for accessing the ad-hoc network. Standardization for the ad-hoc network is currently in the Mobile Ad-hoc Networks (MANET) working group of the Internet Engineering Task Force (IETF).

FIG. 1 is a view schematically illustrating a configuration of a conventional ad-hoc network.

The ad-hoc network is constituted by sub-networks N1, N2 and N3 using multi-hopping routing, wherein wireless terminals are connected to each other through Peer-to-Peer (P2) communication. The wireless terminals 101 to 115 in FIG. 1 can constitute a network by themselves, even without using an existing Infrastructure (IS) network. The IS network may include conventional 2G and 3G networks supporting mobile communication service, and the 4G network currently being developed. In the ad-hoc network illustrated in FIG. 1, the wireless terminals 101 to 115 can access an IS network through a gateway 117, which interconnects heterogeneous networks. In the following illustrations, solid lines drawn between the wireless terminals represent routes through which the wireless terminals can communicate with each other.

In the ad-hoc network illustrated in FIG. 1, a phenomenon is generated where, as the number of routing hops which the wireless terminals 101, 103, 105 and 107 perform for end-to-end data transmission increases, the performance rapidly degrades in terms of transmission capacity, transmission delay and the like. In this case, a problem exists in that a topology change or the like occurs on an intermediate route in the ad-hoc network, and the loss or error probability of transmitted data rapidly increases. Accordingly, research has been conducted on methods for interconnecting an ad-hoc network and an IS network to reduce the multi-hopping probability and to transmit data with just a few hops, rather than using methods for constructing the entire network only with an ad-hoc network.

Differently from an ad-hoc network of a ubiquitous sensor network, an ad-hoc network using wireless terminals must guarantee mobility of wireless terminals and enable the wireless terminals to transmit and receive various contents, such as voice, data and moving pictures, during the movement of the wireless terminals. Therefore, for the ad-hoc network using wireless terminals, a structure of interconnecting an ad-hoc network and an IS network is suitable, rather than a pure ad-hoc network structure, such as a sensor network. In the following description, the term "ad-hoc network" denotes an ad-hoc network using wireless terminals.

In the case where an ad-hoc network and an IS network are interconnected, an Industrial, Scientific, and Medical (ISM) band is used in the ad-hoc network, while a licensed frequency band other than the ISM band is used in the IS network. The ISM band is a frequency band which is reserved for use by industrial, scientific, and medial fields all over the world. Considering the structure of interconnecting an ad-hoc network and an IS network, a wireless terminal must include two interfaces for accessing two mutually different frequency bands. Therefore, the construction of the wireless terminal is complicated and implementing technology for cooperating frequency bands between the ad-hoc network and the IS network is difficult.

Meanwhile, one principal effect of the ad-hoc network is that wireless terminals can communicate with each other in shadow areas, where access devices, such as base stations and APs, do not support communication. An alternative for solving the shadow area problem is a relay scheme for coverage expansion, which is proposed in the Institute of Electrical and Electronics Engineers (IEEE) 802.16j standard.

FIG. 2 is a view schematically illustrating a configuration of a conventional network system to which a relay scheme for coverage expansion is applied.

An example of the relay scheme applied to the network system illustrated in FIG. 2 is a Mobile Multi-hop Relay (MMR) scheme defined in IEEE 802.16j.

According to the relay scheme of FIG. 2, relay stations 203 and 205 are installed at areas outside the radius of cell C0 in order to support the communication of wireless terminals which exist outside the radio coverage of an AP 201, such as a base station. The relay stations 203 and 205 relay signals transmitted and received between the AP 201 and wireless terminals 207 and 209 in order to support communication of the wireless terminals 207 and 209, which are located outside the cell. For example, in the case of a relay station employing an MMR scheme proposed in IEEE 802.16j, the two relay stations can be connected in a mesh communication scheme, and each wireless terminal located outside the cell is connected to the nearest relay station.

The relay scheme of FIG. 2 has an advantage in that shadow areas are eliminated. However, the relay scheme of FIG. 2 has disadvantages in that coverage expansion is limited because the maximum number of hops for signal transference is limited to three and the relay stations are poor in flexibility.

When a multi-hop transmission is performed using an ad-hoc network, as described above, the shadow area problem can be solved. However, many problems, such as transmission delay, error rate increase, degradation of transmission bandwidth and frequent change of the transmission path occur in implementing the ad-hoc network. In addition, when a frequency in the ISM band is used in the ad-hoc network, frequency interference may occur with other communication schemes using the ISM band. Also, when an ad-hoc network and an IS network are interconnected, the implementation technology is complicated, as described above, and the service provision range is limited because authentication of terminals cannot be performed due to characteristics of the ad-hoc network using the ISM band.

Therefore, a need exists for a wireless communication system and method for interconnecting an ad-hoc network and an IS network.

SUMMARY OF THE INVENTION

An aspect of the present invention is to address at least the above-mentioned problems and/or disadvantages and to provide at least the advantages described below. Accordingly, an aspect of the present invention is to provide a wireless communication system in which an ad-hoc network and an IS network are dynamically interconnected, and a wireless terminal and communication method for the wireless communication system.

Another aspect of the present invention is to provide an ad-hoc network for providing a communication service using a provider's licensed frequency, and a wireless terminal and communication method therefor.

A further aspect of the present invention is to provide a wireless communication system for providing a service which requires a wireless terminal to be authenticated in an ad-hoc network, and a wireless terminal and communication method for the wireless communication system.

In accordance with an aspect of the present invention, a communication method of a wireless terminal in a wireless communication system including an Infrastructure (IS) network is provided. The method includes transmitting a discovery signal including terminal information of the wireless terminal to a radio network, receiving a response signal including information for network access from a base station or another wireless terminal, which has received the discovery signal, selecting an operation mode for access to a network through the base station or the other wireless terminal, based on the response signal, communicating with the base station and accessing the IS network when the selected operation mode corresponds to a first mode, and accessing a network, to which the other wireless terminal belongs, through a licensed frequency band of the IS network when the selected operation mode corresponds to a second mode.

In accordance with another aspect of the present invention, a wireless terminal in a wireless communication system including an Infrastructure (IS) network is provided. The wireless terminal includes a discovery signal transmission and reception unit for transmitting a discovery signal including terminal information of the wireless terminal to a radio network, and for receiving a response signal including information for network access from a base station or another wireless terminal, which has received the discovery signal, an operation mode selection unit for analyzing the response signal and selecting an operation mode suitable for a current network circumstance, and a mode control unit for performing a control operation to communicate with the base station and to access the IS network when the selected operation mode corresponds to a first mode and to access a network, to which the other wireless terminal belongs, through a licensed frequency band of the IS network when the selected operation mode corresponds to a second mode.

In accordance with a further aspect of the present invention, a wireless communication system including an Infrastructure (IS) network is provided. The system includes at least one wireless terminal for transmitting a discovery signal including terminal information of the wireless terminal to a radio network, for receiving a response signal including information for network access from a base station or another wireless terminal, which received the discovery signal, for selecting an operation mode suitable for the current network circumstance by analyzing the response signal, for communicating with the base station and accessing the IS network when the selected operation mode corresponds to a first mode and for accessing a network, to which the other wireless terminal belongs, through a licensed frequency band of the IS network when the selected operation mode corresponds to a second mode, and the base station of the IS network for assigning the licensed frequency band.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
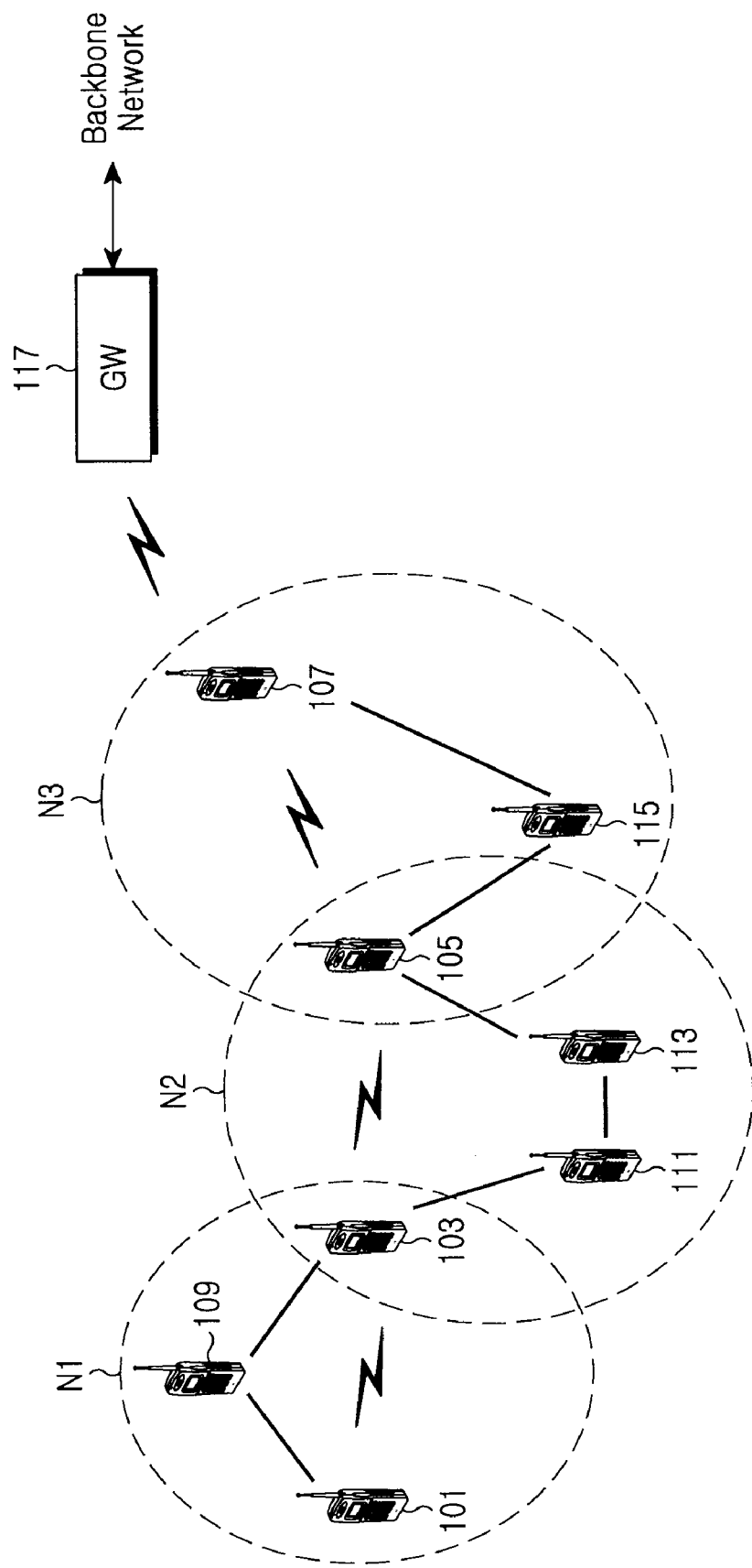
FIG. 1 is a view schematically illustrating a configuration of a conventional ad-hoc network.
Figure 2:
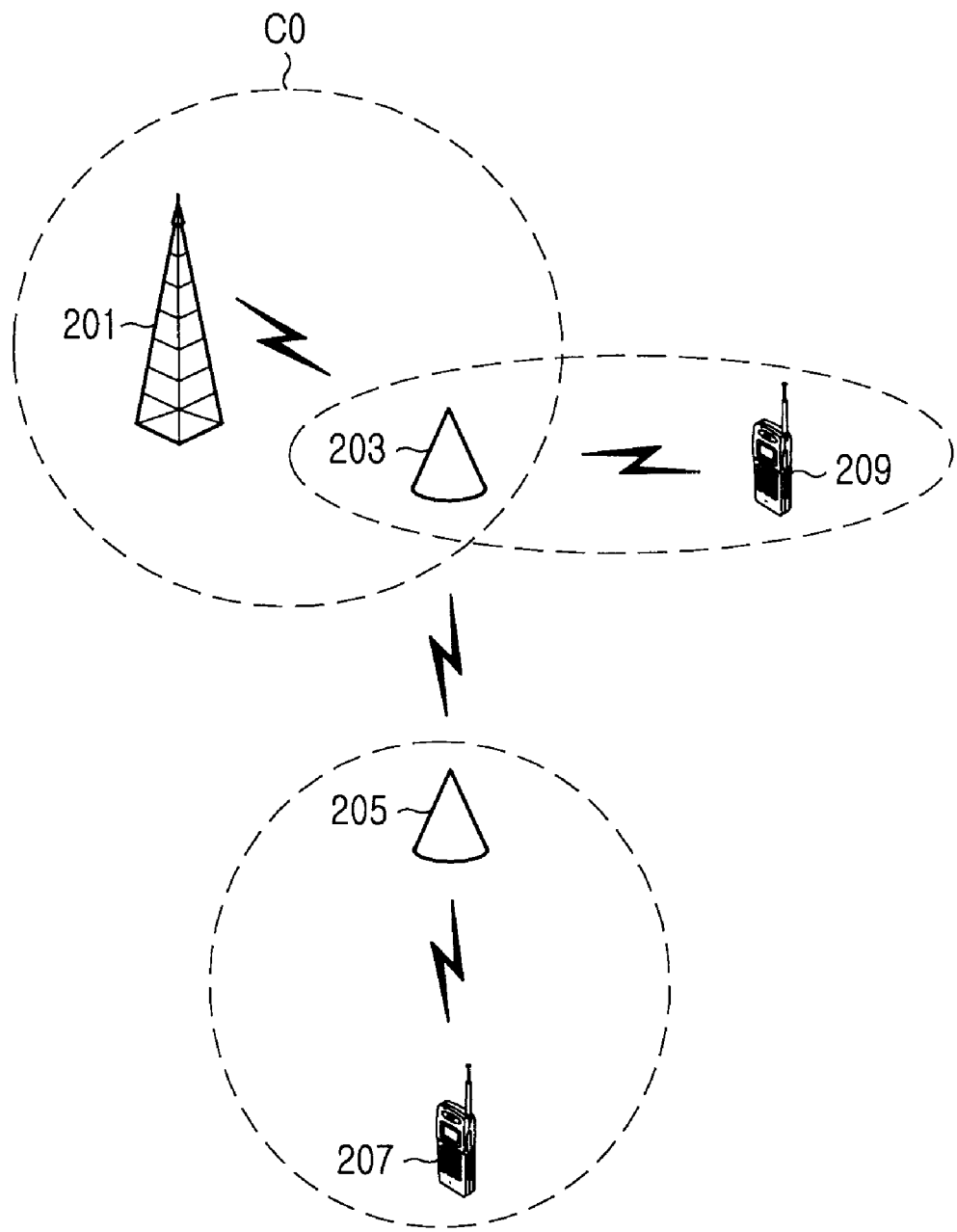
FIG. 2 is a view schematically illustrating the configuration of a conventional network system to which a relay scheme for coverage expansion is applied.

The following description with reference to accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a method for supporting an ad-hoc service authenticated in an ad-hoc network, for supporting a communication service linked between an Infrastructure (IS) network and the ad-hoc network and for providing an existing wireless communication service, through use of a provider's licensed frequency band in the IS network.

Exemplary embodiments of the present invention provide four operation modes according to circumstances of a wireless terminal accessing a network. Moreover, exemplary embodiments of the present invention provide a detailed procedure for enabling the wireless terminal to carry out communication through use of a frequency band individually licensed in the IS network or ad-hoc network, or supporting communication between a wireless terminal in the IS network and a wireless terminal in the ad-hoc network, according to the operation modes. The operation modes of a wireless terminal provided include an infrastructure mode for carrying out communication in an existing IS network, an ad-hoc mode for carrying out communication in an ad-hoc network constituted through a self-configuration procedure, a relay mode for enabling a wireless terminal located outside the region of the IS network to communicate with the IS network through a relay station and a dual mode for supporting communication between a wireless terminal in the IS network and a wireless terminal in the ad-hoc network. In the four operation modes, a wireless terminal always uses a provider's licensed frequency band for carrying out communication, except for the ad-hoc mode.

According to exemplary embodiments of the present invention, in order to select one mode from the operation modes, a network discovery channel is assigned such that a wireless terminal may discover a network which is accessible by the wireless terminal. A wireless terminal, which accesses a network, broadcasts a network discovery packet including information on the wireless terminal through the network discovery channel. When a base station or another wireless terminal in an IS network has received the network discovery packet, the base station or the other wireless terminal transmits, as a response signal, information and current network environment information to the wireless terminal that transmitted the network discovery packet. The network environment information may include information on the network, to which the base station or wireless terminal that transmitted the response signal belongs, and information necessary for accessing the network. When receiving the response signal from the base station or the other wireless terminal, the wireless terminal selects a proper operation mode from among the four operation modes according to the information included in the response signal, and accesses an IS network or ad-hoc network according to the selected operation mode. The network discovery procedure may include an access/paging function for allowing a wireless terminal to access a base station in the existing IS network.

In an exemplary implementation, a network control channel is assigned for periodic control information transmission between a base station in the IS network and a wireless terminal in the ad-hoc network. The control information may include at least one piece of information related to usage of a network and a service, including network access information of a wireless terminal, network management information, service authentication information and resource usage authentication information. For example, a base station in the IS network and a leader terminal in the ad-hoc network may efficiently assign radio resources, as well as prevent interference when assigning the radio resources, by monitoring the access circumstances of the IS network and ad-hoc network through the network control channel. Authentication for using a licensed frequency band of an IS network in an ad-hoc network may also be performed through the network control channel. The leader terminal represents a terminal which performs approval for access to another wireless terminal, routing management, collision management and the like in an ad-hoc network. The network discovery channel and the network control channel are assigned a common channel. However, the type of channel assigned for the network discovery channel and the network control channel is not limited, and may be of a form through which communication may be carried out between a wireless terminal and another wireless terminal, or a base station.

Hereinafter, examples of a configuration of a wireless communication system and a Medium Access Control (MAC) frame, to which the ad-hoc mode, the relay mode and the dual mode are applied, will be described with reference to FIGS. 3 to 8.

Figure 3:
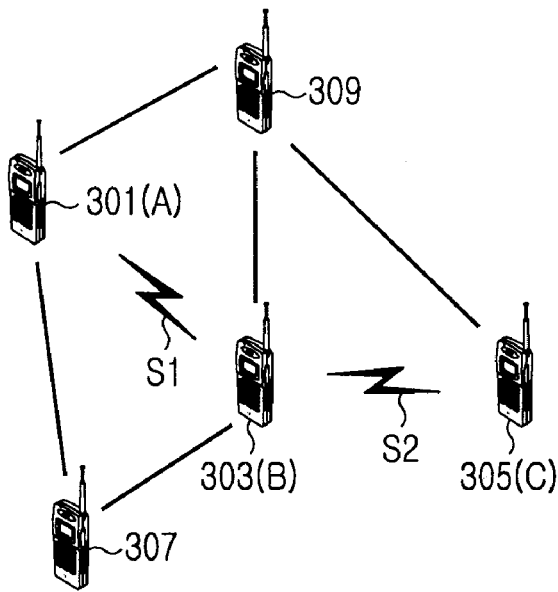
FIG. 3 is a view illustrating an ad-hoc mode applied in a wireless communication system according to an exemplary embodiment of the present invention.
Figure 4:
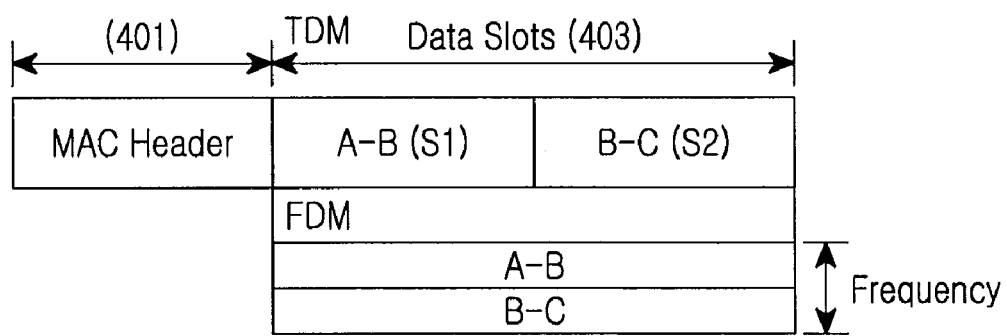
FIG. 4 is a view illustrating a format of a MAC frame when an ad-hoc mode is applied in a wireless communication system according to an exemplary embodiment of the present invention.

FIG. 3 is a view illustrating an ad-hoc mode applied in a wireless communication system according to an exemplary embodiment of the present invention. FIG. 4 is a view illustrating a format of a MAC frame when an ad-hoc mode is applied in a wireless communication system according to an exemplary embodiment of the present invention.

In an exemplary implementation, when a wireless terminal fails to access an IS network, the wireless terminal may access the network in the ad-hoc mode. In FIG. 3, a plurality of wireless terminals 301 to 309 constitute an ad-hoc network. A MAC frame as illustrated in FIG. 4 is transmitted through the ad-hoc network. The ad-hoc network is constructed through a self-configuration procedure for a first network setup, wherein one leader terminal (not illustrated) selected from among the wireless terminals 301 to 309 performs an overall network management, including approval for access to another wireless terminal, routing management, collision management and the like. A procedure for configuring an ad-hoc network is widely known in the art, so a detailed description thereof will be omitted. The wireless terminals 301, 303 and 305 in FIG. 3 correspond to terminals A, B and C, respectively, which are assigned resources (e.g., slot or frequency resources) in the MAC frame of FIG. 4. In FIG. 3 reference mark S1 designates a transmission section between terminals A and B, and reference mark S2 designates a transmission section between terminals B and C. The MAC frame in FIG. 4 includes a header 401 and data slots 403, and may have the format of a MAC frame widely known in ad-hoc network technology. Although an exemplary embodiment of the present invention is described regarding a case where slot or frequency resources are used as resources assigned to wireless terminals, the present invention may be modified in various schemes, such as a scheme of assigning code resources or a two-dimensional assignment scheme of assigning slot and frequency resources, according to transmission schemes applied to the network.

Figure 5:
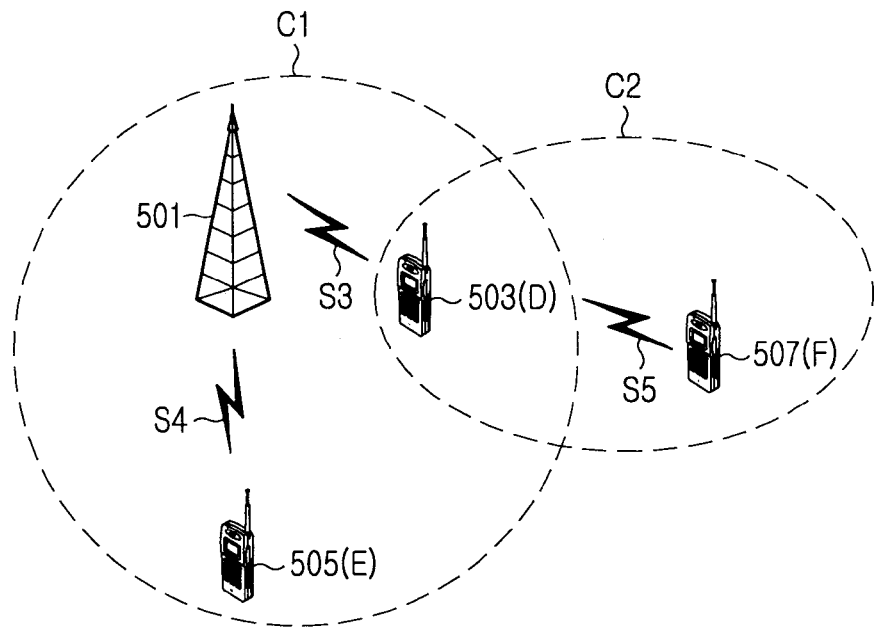
FIG. 5 is a view illustrating a relay mode applied in a wireless communication system according to an exemplary embodiment of the present invention.
Figure 6:
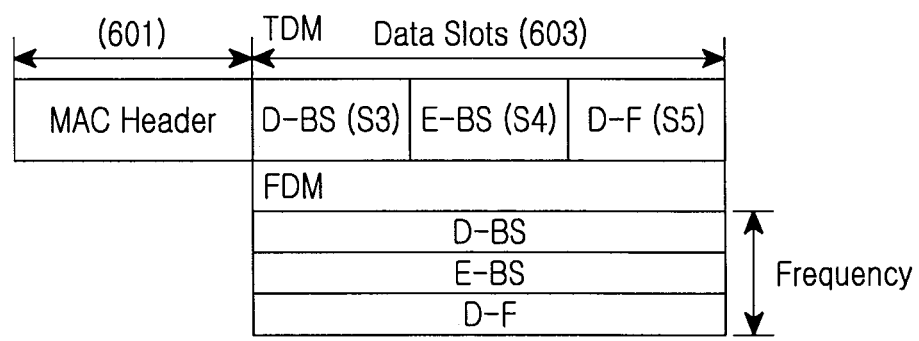
FIG. 6 is a view illustrating a format of a MAC frame when a relay mode is applied in a wireless communication system according to an exemplary embodiment of the present invention.

FIG. 5 is a view illustrating a relay mode applied in a wireless communication system according to an exemplary embodiment of the present invention. FIG. 6 is a view illustrating a format of a MAC frame when a relay mode is applied in a wireless communication system according to an exemplary embodiment of the present invention.

In an exemplary implementation, a wireless terminal located outside the coverage area of an IS network may access the IS network by using another wireless terminal adjacent to the IS network as a relay station. In FIG. 5, a base station 501 and wireless terminals 503 and 505 constitute an IS network. A wireless terminal 507 located outside coverage area C1 of the IS network makes a network access request for the IS network by using an adjacent terminal 503 in coverage area C2 as a relay station. The adjacent terminal 503 transfers the network access request to the base station 501. The base station 501 assigns resources (e.g., slot or frequency resources), as illustrated in FIG. 6, such that interference between terminals does not occur. The wireless terminals 503, 505 and 507 in FIG. 5 correspond to terminals D, E and F, respectively, which are assigned resources (e.g., slot or frequency resources) in the MAC frame of FIG. 6. In FIG. 6, reference mark S3 designates a transmission section between terminal D and the base station 501, reference mark S4 designates a transmission section between terminal E and the base station 501 and reference mark S5 designates a transmission section between terminal D and terminal F. The MAC frame in FIG. 6 includes a header 601 and data slots 603, which may, for example, have the format of a MAC frame widely known in a Mobile Multi-hop Relay (MMR) scheme of the Institute of Electrical and Electronics Engineers (IEEE) 802.16j standard.

Figure 7:
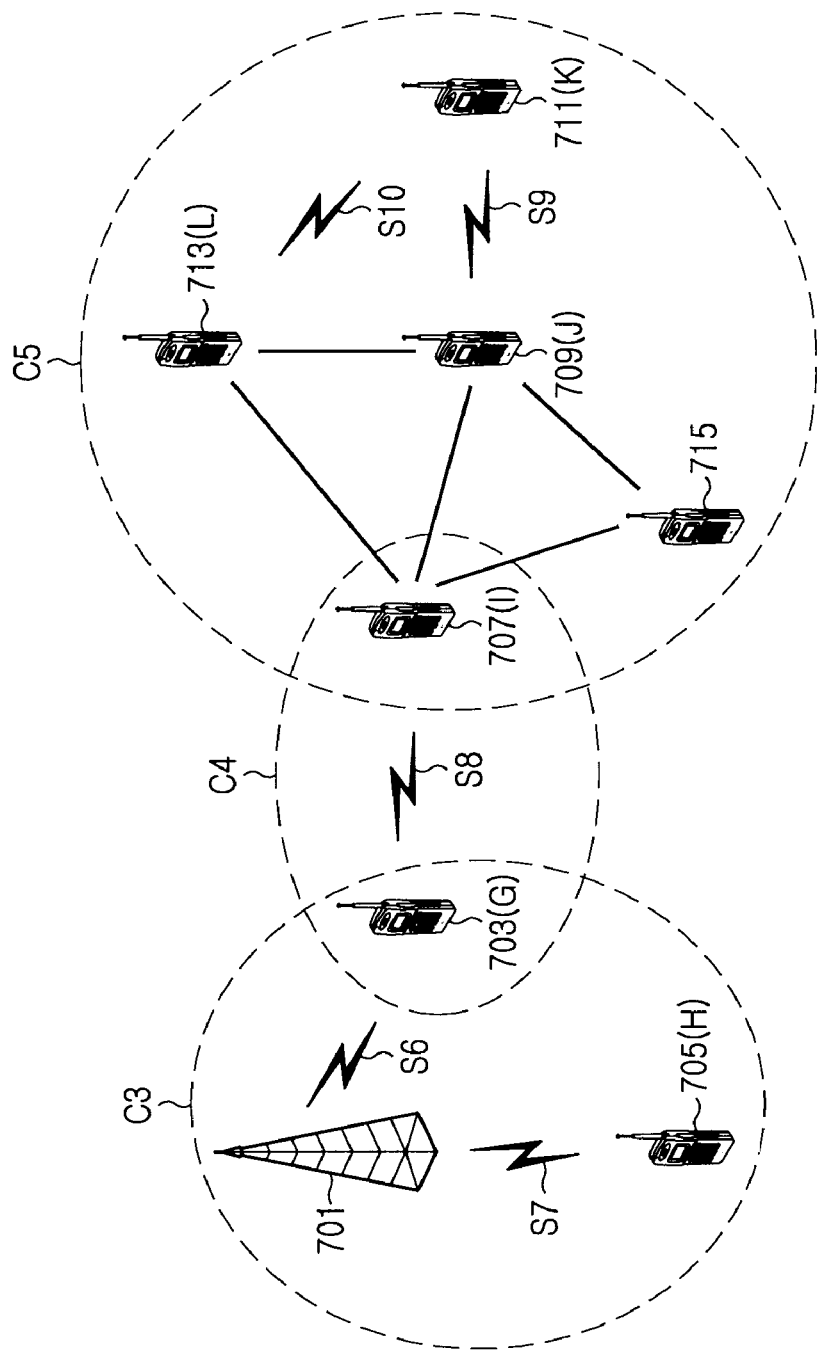
FIG. 7 is a view illustrating a dual mode applied in a wireless communication system according to an exemplary embodiment of the present invention.
Figure 8A:
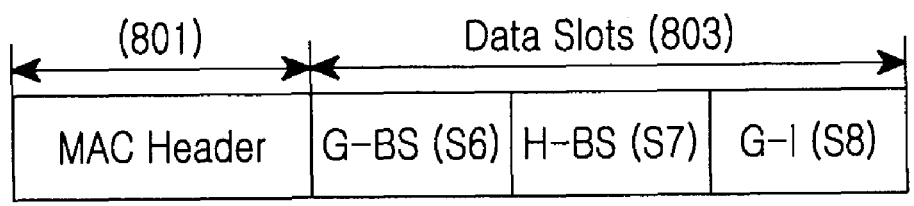
FIGS. 8A and 8B are views illustrating an example of a format of a MAC frame when a dual mode is applied in a wireless communication system according to an exemplary embodiment of the present invention.
Figure 8B:
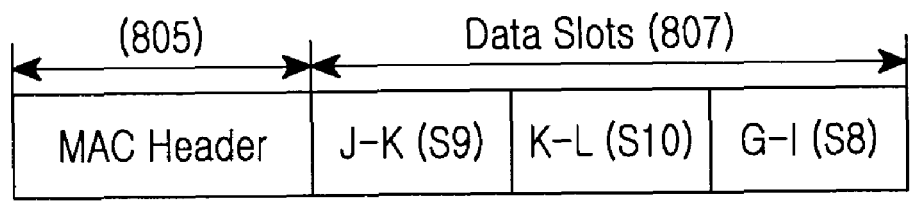

FIG. 7 is a view illustrating an example where a dual mode is applied in a wireless communication system according to an exemplary embodiment of the present invention. FIGS. 8A and 8B are views illustrating a format of a MAC frame when a dual mode is applied in a wireless communication system according to an exemplary embodiment of the present invention.

In an exemplary implementation, the dual mode is proposed to support communication between a wireless terminal in an IS network and a wireless terminal in an ad-hoc network. In FIG. 7, a base station 701 and wireless terminals 703 and 705 constitute an IS network having coverage area C3, and wireless terminals 707 to 715 constitute an ad-hoc network having coverage area C5. In this case, communication is carried out using a provider's licensed frequency band, even in the ad-hoc network. The base station 701 in the IS network performs an authentication task such that the terminals 707 to 715 use a licensed frequency band in the ad-hoc network, wherein service authentication and usage authentication of a licensed frequency band may be performed through the aforementioned network control channel. Also, service authentication and usage authentication of a frequency band for the wireless terminals 707 to 715 may be performed in an upper stage of the base station 701, e.g., in an authentication server (not illustrated) of the IS network. In coverage area C4, communication between the wireless terminal 703 in the IS network and the wireless terminal 707 in the ad-hoc network is also carried out through use of a licensed frequency band. In this case, as resources (e.g., slot or frequency resources) for communication between the wireless terminals 703 and 707, resources not overlapping with resources assigned to other wireless terminals 705 and 709 to 715 in the IS network and the ad-hoc network are assigned, so that interference is prevented from occurring.

In FIG. 7, the wireless terminals 709 to 715, except for the wireless terminal 707, among wireless terminals which have accessed the ad-hoc network, may communicate with the IS network through use of a licensed frequency band via the wireless terminal 707. Therefore, when the dual mode is used, various services, such as Peer-to-Peer (P2P)-type service and accounting, which requires authentication, may be provided to the wireless terminals 709 to 715 through the ad-hoc network and in an area outside coverage area C3 of the IS network.

The wireless terminals 703, 705, 707, 709, 711 and 713 in FIG. 7 correspond to terminals G, H, I, J, K and L, respectively, which are assigned resources (e.g., slot or frequency resources) in the MAC frames of FIGS. 8A and 8B. FIG. 8A illustrates a configuration of a MAC frame upon Time Division Multiplex (TDM) transmission in the IS network, and FIG. 8B illustrates a configuration of a MAC frame upon TDM transmission in the ad-hoc network. The resource assignment section in a MAC frame is transformed from slots to frequencies upon Frequency Division Multiplex (FDM) transmission in the dual mode, as illustrated in FIGS. 4 and 6. In FIG. 7, reference mark S6 designates a transmission section between terminal G and the base station 701, reference mark S7 designates a transmission section between terminal H and the base station 701, reference mark S8 designates a transmission section between terminal G and terminal I, reference mark S9 designates a transmission section between terminal J and terminal K and reference mark S10 designates a transmission section between terminal K and terminal L. The MAC frame in FIG. 8A includes a header 801 and data slots 803 which are defined in the IS network. The MAC frame in FIG. 8B includes a header 805 and data slots 807 which are defined in the ad-hoc network. Referring to an exemplary configuration of the MAC frames illustrated in FIGS. 8A and 8B, it may be understood that resources for the S8 transmission section are assigned in the MAC frame of the IS network and the MAC frame of the ad-hoc network, respectively, according to a dual-mode operation. Resources not overlapping those assigned for other transmission sections S6, S7, S9 and S10 are assigned as the resources for the S8 transmission section. Therefore, when the wireless terminals carry out communication in the dual mode, interference between the IS network and the ad-hoc network may be prevented from occurring.

As described above in relation to the network configuration, according to an exemplary embodiment of the present invention, one mode among the infrastructure mode, the ad-hoc mode, the relay mode and the dual mode is applied according to the circumstances of the network which the wireless terminal accesses. Among the operation modes of the wireless terminal, since the infrastructure mode and the ad-hoc mode are applied in different network regions, no interference occurs between networks where the two operation modes are applied. Therefore, in the two operation modes, it is possible to use respective specific frame structures and a detailed operation and network configuration method may vary depending on the wireless network, to which the modes are applied. In the dual mode, a MAC frame structure of the IS network, a MAC frame structure of the ad-hoc network or a pre-engaged MAC frame structure may be used, between the wireless terminals 703 and 707, for example. Therefore, since wireless terminals use a frequency band licensed for all the wireless terminals when carrying out communication between an IS network and an ad-hoc network, the wireless terminals may carry out communication in a MAC layer through use of one interface.

When the dual mode according to an exemplary embodiment of the present invention is applied, interference is prevented from occurring in an overlapping area between networks, when terminals access a network in mutually different modes and various data may be shared to achieve cooperation between networks, data transference between terminals (i.e., mobile relay), P2P and the like.

Hereinafter, the operations for selecting a proper operation mode based on the circumstances of a network accessed by a wireless terminal, and for carrying out communication according to an exemplary embodiment of the present invention will be described with reference to FIGS. 9 to 12.

Figure 9:
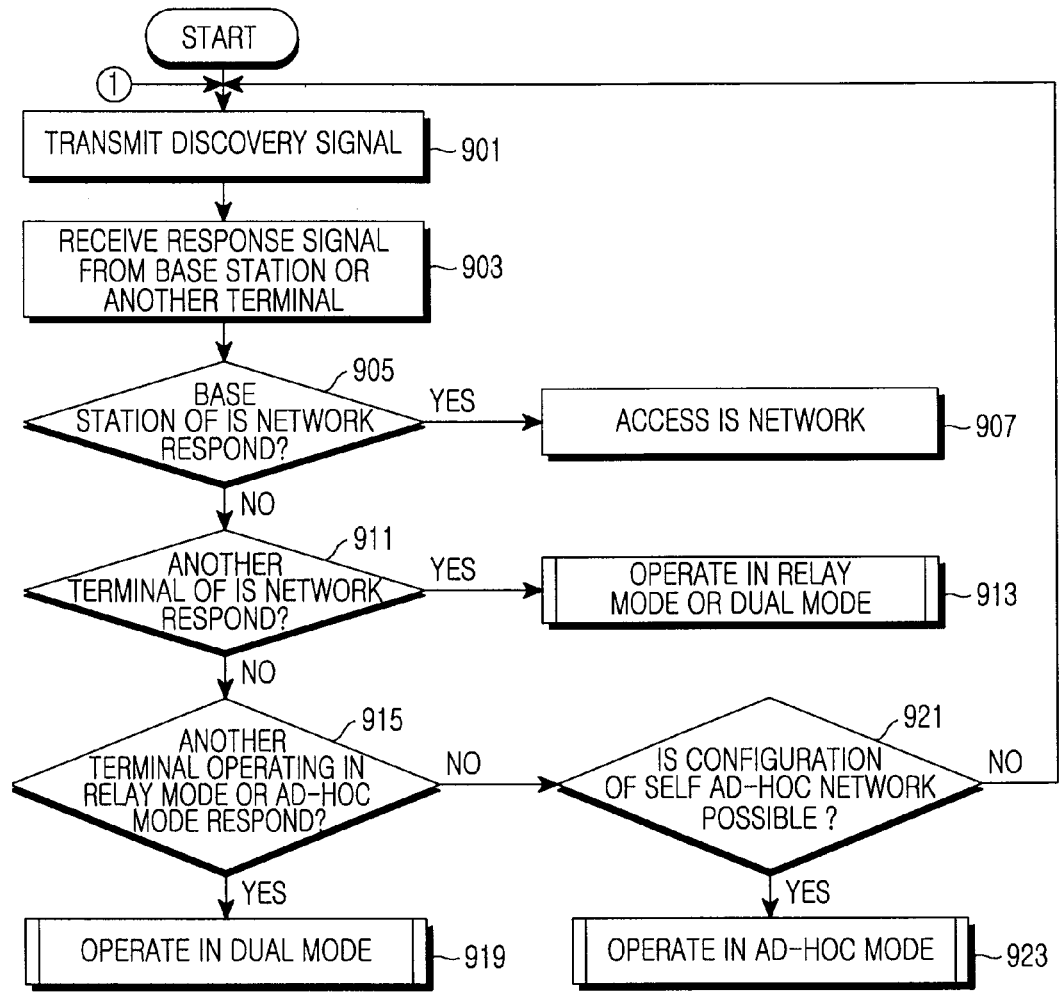
FIG. 9 is a flowchart illustrating a communication method for selecting an operation mode based on circumstances of a network accessed by a wireless terminal according to an exemplary embodiment of the present invention.

FIG. 9 is a flowchart illustrating a communication method for selecting an operation mode based on the circumstances of a network accessed by a wireless terminal according to an exemplary embodiment of the present invention.

Referring to FIG. 9, in step 901, a wireless terminal, which has been powered on, broadcasts a network discovery packet (i.e., a discovery signal) including information on the wireless terminal through a common channel in order to discover a network which is accessible by the wireless terminal, as an initial operation. In step 903, when a response signal to the discovery signal is transmitted from a base station of an IS network or another wireless terminal, the wireless terminal that transmitted the discovery signal receives the response signal. The response signal includes information on the base station or another terminal which has received the discovery signal and includes the current network circumstance information perceived by the base station or another terminal. Here, the network circumstance information may include information on a network, to which the base station or another terminal that transmitted the response signal belongs, and information necessary for accessing the network. Occasionally, the response signal may include information on the operation mode which the wireless terminal should select. Therefore, the wireless terminal may select a network currently accessible by the wireless terminal, based on the response signal received from the base station or another terminal. In this case, the wireless terminal attempts to access a base station of an IS network and to access the IS network or an ad-hoc network through another wireless terminal when failing to access the base station network. However, the access attempt order is optional and may vary.

In step 905, the wireless terminal determines if a response signal has been received from the base station of the IS network. When it is determined that a response signal has been received from the base station of the IS network, the wireless terminal accesses the IS network based on information included in the response signal in step 907. The procedure for accessing the IS network may be achieved through use of a widely known scheme, so a detailed description thereof will be omitted. In contrast, when it is determined in step 905 that a response signal has not been received from the base station, the wireless terminal determines if a response signal has been received from another wireless terminal in the IS network in step 911. When a response signal has been received from another wireless terminal in the IS network, the wireless terminal operates in the relay mode or the dual mode depending on whether an existing ad-hoc network exists in step 913, thereby accessing a network. A description of step 913 will be described with reference to FIG. 10.

When it is determined in step 911 that a response signal has not been received from another wireless terminal in the IS network, the wireless terminal determines if a response signal has been received from another wireless terminal operating in the relay mode or the ad-hoc mode in step 915. In step 915, a wireless terminal operating in the relay mode represents, for example, the terminal 507 which is located outside coverage area C1 of the IS network and operates in the relay mode, as illustrated in FIG. 5. When it is determined in step 915 that a response signal has been received, the wireless terminal shifts to the dual mode and accesses the existing ad-hoc network in step 919. A description of step 919 will be described with reference to FIG. 11.

Meanwhile, when it is determined in step 915 that a response signal has not been received, the wireless terminal determines if it is possible to configure a self ad-hoc network according to a self-configuration procedure for the first network setup in step 921. When it is determined that it is possible to configure a self ad-hoc network, the wireless terminal shifts to the ad-hoc mode and configures a new ad-hoc network in step 923. A detailed procedure of step 923 will be described later with reference to FIG. 12. When it is impossible to configure a self ad-hoc network in step 921, the wireless terminal returns to step 901 and repeats the aforementioned steps until the wireless terminal may access a network.

Figure 10:
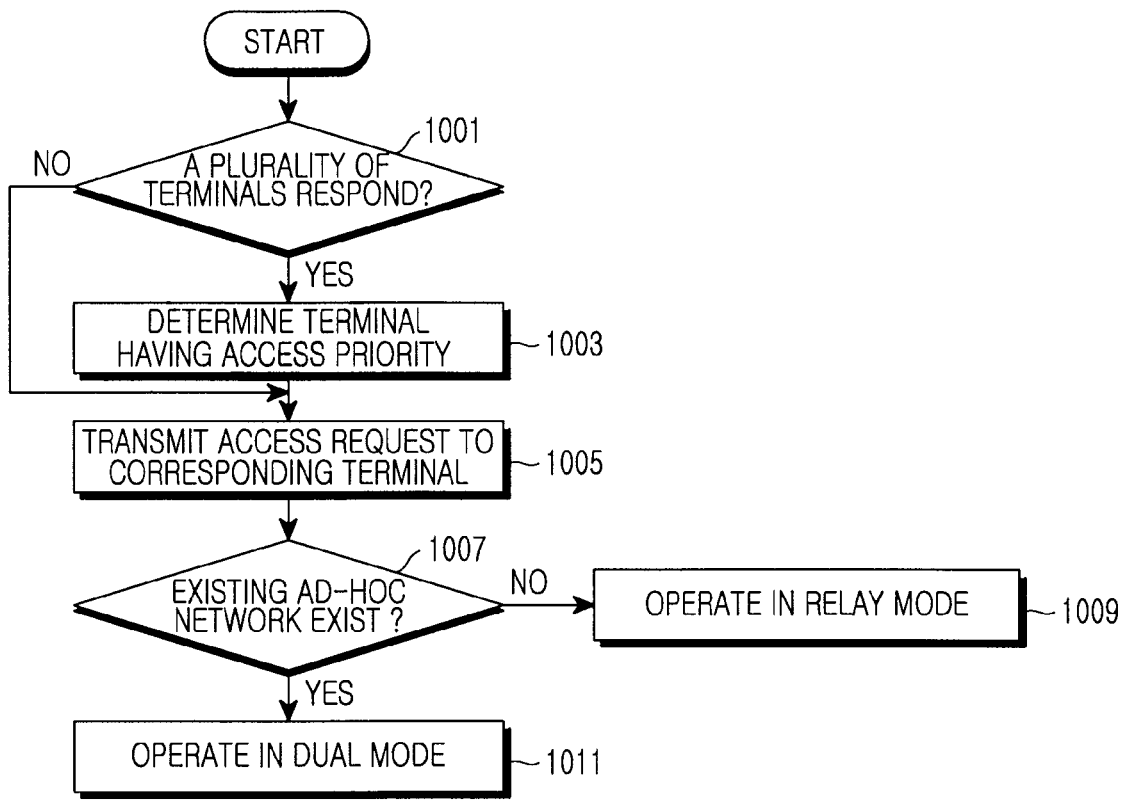
FIG. 10 is a flowchart illustrating a procedure for a wireless terminal operating in a relay mode or a dual mode according to an exemplary embodiment of the present invention.

FIG. 10 is a flowchart illustrating a procedure for a wireless terminal operating in a relay mode or a dual mode according to an exemplary embodiment of the present invention.

In step 1001, the wireless terminal determines if response signals have been received from a plurality of other wireless terminals. When response signals have been received from a plurality of other wireless terminals, the wireless terminal identifies access priorities of the other wireless terminals in step 1003, determines a wireless terminal having a highest priority and transmits a network access request to the determined wireless terminal in step 1005. The access priorities may be determined by taking into consideration, for example, a provider's service rule (e.g., QoS), a terminal having no activated communication channel, a terminal carrying out communication at a low speed, a terminal having a radio channel of good state, a terminal having sufficient reserve power and the like. In addition, the access priorities may be changed and applied according to the types of networks, types of service and the like. The response signal may include information necessary for determining the access priority.

In step 1007, the wireless terminal determines if another terminal in the IS network, to which the wireless terminal has transmitted the access request, is a terminal that accessed the existing ad-hoc network. When it is determined in step 1007 that there is no existing ad-hoc network, the wireless terminal operates in the relay mode in step 1009, and communicates with the IS network. In contrast, when it is determined in step 1007 that there is an existing ad-hoc network, the wireless terminal shifts to the dual mode in step 1011, so that the wireless terminal may communicate with the IS network through the existing ad-hoc network.

Figure 11:
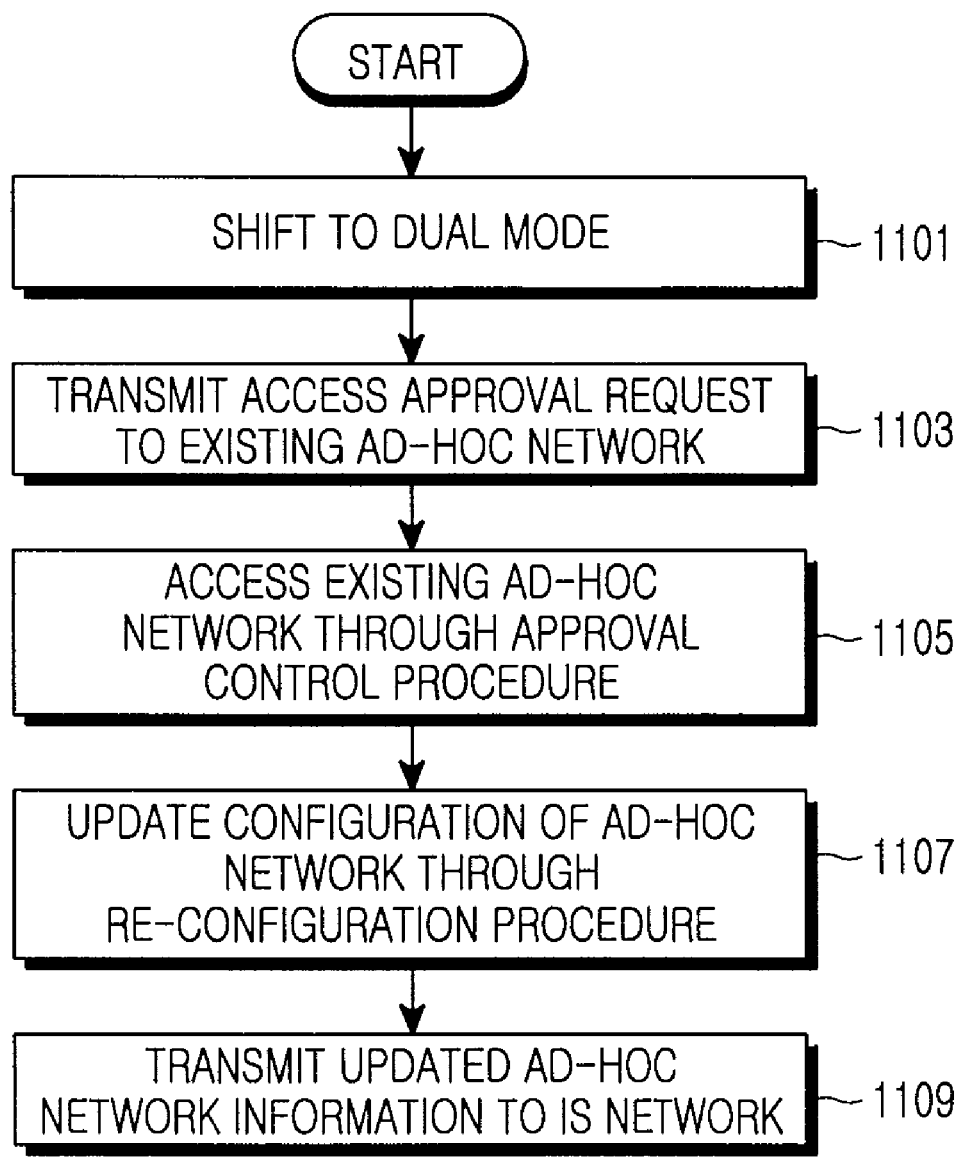
FIG. 11 is a flowchart illustrating a procedure for a wireless terminal operating in a dual mode and accessing an existing ad-hoc network according to an exemplary embodiment of the present invention.

FIG. 11 is a flowchart illustrating a procedure for a wireless terminal operating in a dual mode and accessing an existing ad-hoc network according to an exemplary embodiment of the present invention. Also, step 1011 in FIG. 10 is performed according to the procedure illustrated in FIG. 11.

Referring to FIG. 11, the wireless terminal shifts to the dual mode in step 1101, and requests approval for access to the existing ad-hoc network in step 1103. Here, the access approval is performed through a leader terminal of the ad-hoc network. In step 1105, the wireless terminal accesses the existing ad-hoc network through a widely known approval control procedure of the ad-hoc network. When the wireless terminal's access to the existing ad-hoc network is approved through the above procedure, the leader terminal of the ad-hoc network updates the configuration of the ad-hoc network through a widely known re-configuration procedure in step 1107 and transmits updated ad-hoc network information to the base station of the IS network in step 1109.

Figure 12:
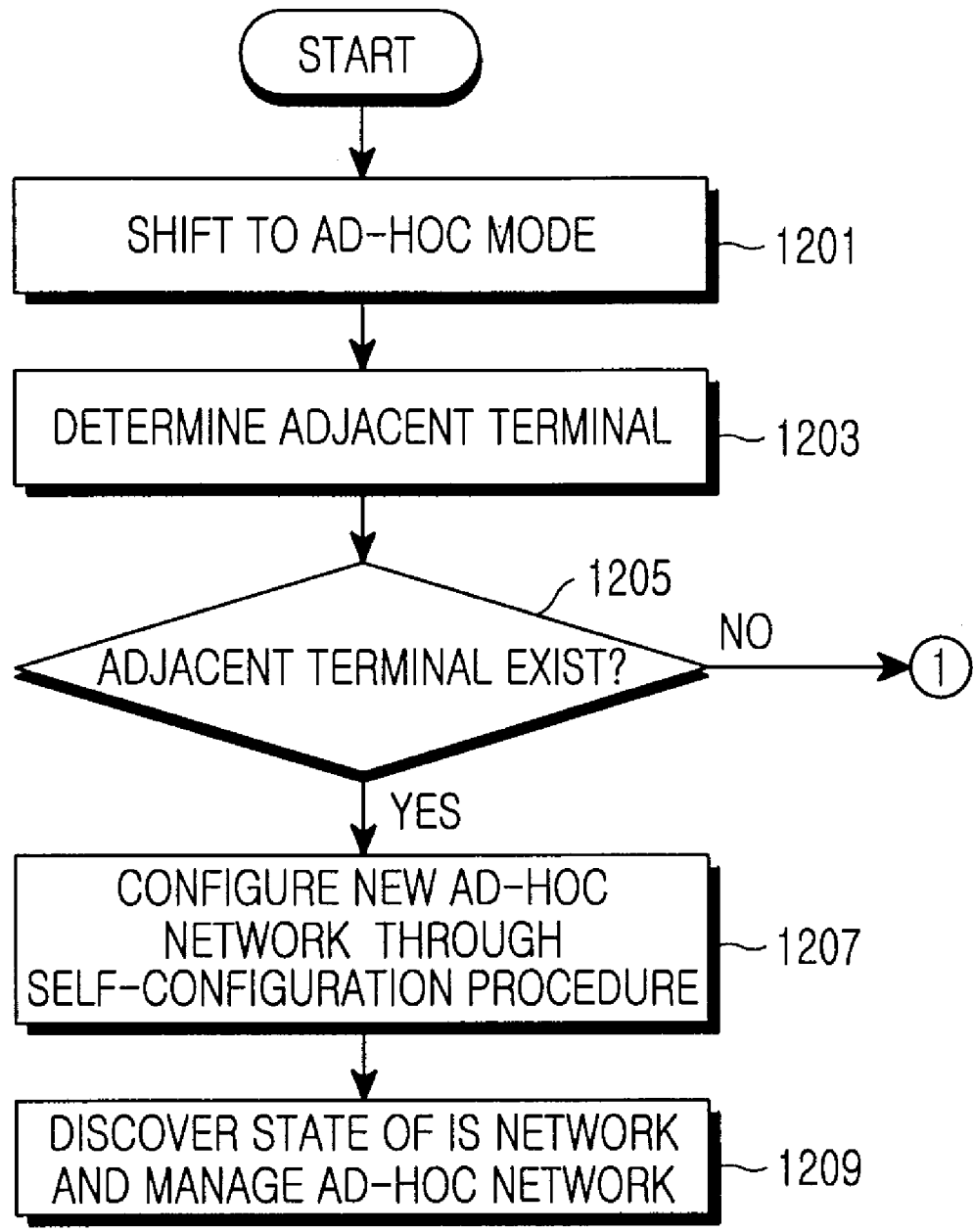
FIG. 12 is a flowchart illustrating a procedure for a wireless terminal operating in an ad-hoc mode and configuring a new ad-hoc network according to an exemplary embodiment of the present invention.

FIG. 12 is a flowchart illustrating a procedure for a wireless terminal operating in an ad-hoc mode and configuring a new ad-hoc network according to an exemplary embodiment of the present invention.

Referring to FIG. 12, the wireless terminal shifts to the ad-hoc mode in step 1201 and determines whether an adjacent terminal for configuring an ad-hoc network exists in step 1203 that is performed through a procedure for transmitting a discovery signal. When it is determined that an adjacent terminal exists in step 1205, the wireless terminal configures a new ad-hoc network through a self-configuration procedure in step 1207. The wireless terminal manages the newly-configured ad-hoc network while discovering the IS network state through a network control channel in step 1209. In contrast, when it is determined that no adjacent terminal exists as a result of the discovery in step 1205, the wireless terminal returns to step 901 of FIG. 9 and repeats the aforementioned operations from step 901. Meanwhile, since the ad-hoc network is newly configured according to the procedure of FIG. 12, which uses a frequency band not licensed by the IS network, the newly-configured ad-hoc network uses an existing Industrial, Scientific and Medical (ISM) frequency band. However, when it is possible to receive authentication for use of a licensed frequency band from the base station of the IS network after a new ad-hoc network has been configured, the licensed frequency band may be used in the newly configured ad-hoc network.

Figure 13:
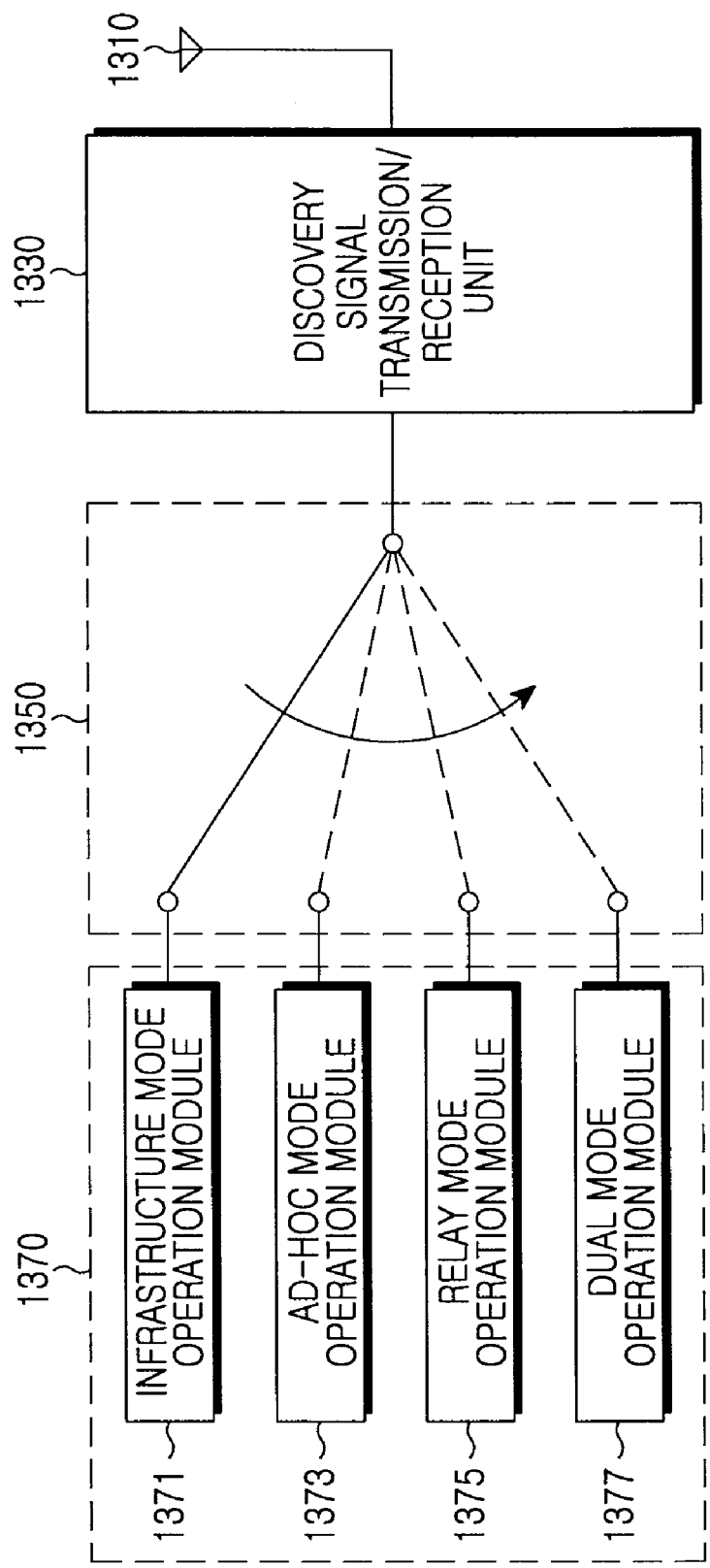
FIG. 13 is a block diagram illustrating a configuration of a wireless terminal according to an exemplary embodiment of the present invention.

FIG. 13 is a block diagram illustrating a configuration of a wireless terminal according to an exemplary embodiment of the present invention.

Referring to FIG. 13, the wireless terminal includes an antenna 1310, a discovery signal transmission and reception unit 1330, an operation mode selection unit 1350 and a mode control unit 1370. The discovery signal transmission and reception unit 1330 transmits a network discovery packet (i.e., a discovery signal) including information on the wireless terminal through a network discovery channel. The discovery signal transmission and reception unit 1330 receives a response signal from a base station or another wireless terminal, which has received the discovery signal, and transfers the response signal to the operation mode selection unit 1350. Also, when the discovery signal transmission and reception unit 1330 receives a discovery signal from another wireless terminal, the discovery signal transmission/reception unit 1330 transmits a response signal to the other wireless terminal, wherein the response signal includes terminal information thereof, and transmits information on the current network circumstances identified by the discovery signal transmission/reception unit 1330. In addition, although not illustrated, the wireless terminal of FIG. 13 may include a control information transmission and reception unit for transmitting and receiving control information to and from a base station of an IS network through a network control channel. The control information transmission and reception unit (not illustrated) is connected to the mode control unit 1370, transfers control information received from the base station to the mode control unit 1370 and transmits control information received from the mode control unit 1370 to the base station. The control information includes at least one of network access information, network management information, service authentication information and resource usage authentication information, and may be periodically transmitted and received.

When the operation mode selection unit 1350 receives a response signal of a base station or another wireless terminal through the discovery signal transmission and reception unit 1330, the operation mode selection unit 1350 analyzes the response signal and selects an operation mode suitable for the current network circumstances. The wireless terminal may select one operation mode from among the infrastructure mode, the ad-hoc mode, the relay mode and the dual mode. The operations in the operation modes are described above, so a detailed description thereof will be omitted. The mode control unit 1370 includes an infrastructure mode operation module 1371, an ad-hoc mode operation module 1373, a relay mode operation module 1375 and a dual mode operation module 1377, to perform a corresponding procedure based on an operation mode which has been selected according to the procedures illustrated in FIGS. 9 to 12.

Exemplary embodiments of the present invention may be modified into various forms. For example, although the exemplary embodiments of the present invention has been described regarding a case where four operation modes are all taken into consideration and one operation mode is selected, a method may be implemented in such a manner as to establish the infrastructure mode as the basic mode and to select at least one operation mode from among the three remaining operation modes.

An exemplary embodiment of the present invention may be applied to communication networks where a shadow area exists, data sharing is required between various types of networks, a traffic congestion occurs in a certain area or an existing infrastructure is to be used to provide an authenticated service in an ad-hoc network.

According to exemplary embodiments of the present invention, through use of a licensed frequency band assigned to a provider of an existing IS network, it is possible to support communication through an existing infrastructure and support communication of an ad-hoc network scheme.

Also, according to exemplary embodiments of the present invention, since ad-hoc network communication using a licensed frequency band is supported, the shadow area problem is solved, and various communication services (e.g., accounting) requiring authentication may be provided, even in the ad-hoc network.

Also, according to exemplary embodiments of the present invention, since an ad-hoc network connected with an existing IS network is provided, it is possible to divert traffic to the ad-hoc network when traffic congestion occurs in the existing IS network.

In addition, according to exemplary embodiments of the present invention, it is possible to efficiently provide communication service in service areas, such as a mountainous area, an insular area, an underpopulated area and the like, where feasibility and utilization with respect to construction of the infrastructure are poor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method of a wireless terminal in a wireless communication system comprising an Infrastructure (IS) network, the method comprising:
   broadcasting a discovery signal comprising terminal information of the wireless terminal to a radio network over a common channel;
   receiving a response signal comprising information for network access from one of a base station and another wireless terminal, which received the discovery signal;
   selecting an operation mode for access to a network through one of the base station and the other wireless terminal, based on the response signal;
   communicating with the base station and accessing the IS network when the selected operation mode corresponds to a first mode; and
   accessing a network, to which the other wireless terminal belongs, through a licensed frequency band of the IS network when the selected operation mode corresponds to a second mode,
   wherein the second mode comprises a dual mode for accessing an ad-hoc network that uses a licensed frequency band of the IS network when the network to which the other wireless terminal belongs is the ad-hoc network.

2. The method of claim 1, wherein the second mode comprises a relay mode for communicating with the IS network by using the other wireless terminal as a relay station, when there is no ad-hoc network to which the other wireless terminal belongs.

3. The method of claim 1, further comprising:
   determining a wireless terminal comprising a highest access priority in a certain scheme, when the other wireless terminal that transmitted the response signal is plural in number; and
   accessing a network based on a response signal received from the other wireless terminal comprising the highest access priority.

4. The method of claim 1, further comprising transmitting updated information of the ad-hoc network to the IS network, when the wireless terminal is approved to access the ad-hoc network.

5. The method of claim 1, further comprising:
   selecting a third mode for configuring a new ad-hoc network as the operation mode, when the response signal is not received from one of the base station of the IS network and the other wireless terminal after the transmission of the discovery signal;
   determining whether an adjacent terminal exists; and
   configuring the new ad-hoc network when an adjacent terminal exists.

6. The method of claim 1, further comprising receiving service authentication from the IS network after accessing the ad-hoc network.

7. The method of claim 6, wherein the service authentication is performed through transmission and reception of control information between the base station of the IS network and a leader terminal of the ad-hoc network.

8. A wireless terminal in a wireless communication system comprising an Infrastructure (IS) network, the wireless terminal comprising:
   a transceiver for transmitting and receiving signals over a radio network; and
   a controller for controlling operations for broadcasting a discovery signal comprising terminal information of the wireless terminal to the radio network over a common channel and for receiving a response signal comprising information for network access from one of a base station and another wireless terminal, which has received the discovery signal, for analyzing the response signal and selecting an operation mode suitable for current network circumstance, and for communicating with the base station, to access the IS network when the selected operation mode corresponds to a first mode and to access a network, to which the other wireless terminal belongs, through a licensed frequency band of the IS network when the selected operation mode corresponds to a second mode,
   wherein the second mode comprises a dual mode for accessing an ad-hoc network that uses the licensed frequency band of the IS network when the network to which the other wireless terminal belongs is the ad-hoc network.

9. The wireless terminal of claim 8, wherein the second mode comprises a relay mode for communicating with the IS network by using the other wireless terminal as a relay station, when there is no ad-hoc network to which the other wireless terminal belongs.

10. The wireless terminal of claim 8, wherein, when the other wireless terminal that transmitted the response signal is plural in number, the controller further performs a control operation to determine a wireless terminal comprising a highest access priority in a certain scheme and to access a network based on a response signal received from the other wireless terminal comprising the highest access priority.

11. The wireless terminal of claim 8, wherein, when the response signal is not received from one of the base station of the IS network and the other wireless terminal after the transmission of the discovery signal, the controller selects a third mode for configuring a new ad-hoc network as the operation mode, and the controller further performs a control operation to determine whether an adjacent terminal exists and to configure the new ad-hoc network when an adjacent terminal exists.

12. The wireless terminal of claim 8, wherein the controller further controls operations of transmitting and receiving control information to and from the base station of the IS network the control information comprising at least one of network access information, service authentication information and resource usage authentication information.

13. A wireless communication system comprising an Infrastructure (IS) network, the system comprising:

a wireless terminal comprising a transceiver for transmitting and receiving signals over a radio network, and a controller for controlling operations for broadcasting a discovery signal comprising terminal information of the wireless terminal to the radio network over a common channel and for receiving a response signal comprising information for network access from one of a base station and another wireless terminal, which received the discovery signal, for analyzing the response signal and for selecting an operation mode suitable for current network circumstance, and for communicating with the base station, to access the IS network when the selected operation mode corresponds to a first mode and to access a network, to which the other wireless terminal belongs, through a licensed frequency band of the IS network when the selected operation mode corresponds to a second mode; and the base station of the IS network for assigning the licensed frequency band, wherein the second mode comprises a dual mode for accessing an ad-hoc network that uses the licensed frequency band of the IS network when the network to which the other wireless terminal belongs is the ad-hoc network.

14. The system of claim 13, wherein the second mode comprises a relay mode for communicating with the IS network by using the other wireless terminal as a relay station, when there is no ad-hoc network to which the other wireless terminal belongs.

15. The system of claim 13, wherein, when the response signal is not received from one of the base station of the IS network and the other wireless terminal after the transmission of the discovery signal, the at least one wireless terminal selects a third mode for configuring a new ad-hoc network as the operation mode, determines whether an adjacent terminal exists and configures the new ad-hoc network when an adjacent terminal exists.

16. The system of claim 15, wherein the base station of the IS network is configured to transmit and receive control information to and from the at least one wireless terminal, the control information comprising at least one of network access information, network management information, service authentication information, and resource usage authentication information.

17. The system of claim 13, wherein, when the other wireless terminal that transmitted the response signal is plural in number, the at least one wireless terminal determines a wireless terminal comprising a highest access priority in a certain scheme, accesses a network based on a response signal received from the other wireless terminal comprising the highest access priority.

* * * * *